(12) United States Patent
Forster et al.

(10) Patent No.: US 7,230,694 B2
(45) Date of Patent: Jun. 12, 2007

(54) METHOD FOR DETERMINING AN AXLE GEOMETRY AND SENSOR FOR ITS EXECUTION

(75) Inventors: Frank Forster, Munich (DE); Lars Jahn, Nuremberg (DE); Claudio Laloni, Taufkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/724,234

(22) Filed: Dec. 1, 2003

(65) Prior Publication Data

US 2005/0030525 A1    Feb. 10, 2005

(30) Foreign Application Priority Data

Aug. 5, 2003    (DE) ................ 103 35 829

(51) Int. Cl.
*G01B 11/26* (2006.01)
(52) U.S. Cl. ................ 356/139.03
(58) Field of Classification Search .......... 356/139.09, 356/155, 139.13, 3.14, 3.15, 3.16
See application file for complete search history.

(56) References Cited

U.S. PATENT DOCUMENTS

| | | | | |
|---|---|---|---|---|
| 3,376,411 A | * | 4/1968 | Montani et al. ............ 356/3.16 |
| 4,097,157 A | * | 6/1978 | Lill ........................ 356/139.09 |
| 4,745,469 A | * | 5/1988 | Waldecker et al. ........... 348/94 |
| 5,054,918 A | | 10/1991 | Downing et al. |
| 5,198,877 A | * | 3/1993 | Schulz ........................ 356/614 |
| 5,274,433 A | * | 12/1993 | Madey et al. ................ 356/155 |
| 5,812,256 A | * | 9/1998 | Chapin et al. .......... 356/139.09 |
| 5,969,246 A | * | 10/1999 | Jackson et al. ................ 73/459 |
| 5,978,077 A | | 11/1999 | Koerner et al. |
| 6,148,528 A | * | 11/2000 | Jackson ........................ 33/288 |
| 6,397,164 B1 | * | 5/2002 | Nobis et al. ................. 702/150 |
| 6,400,451 B1 | | 6/2002 | Fukuda et al. |

FOREIGN PATENT DOCUMENTS

| | | |
|---|---|---|
| DE | 29 48 573 A1 | 6/1981 |
| DE | 41 01 921 A1 | 8/1991 |
| DE | 197 48 239 A1 | 5/1998 |
| DE | 102 32 690 A1 | 2/2004 |

OTHER PUBLICATIONS

Weiyi Liu, Zhaoqi Wang, Guoguang Mu and Zhiliang Fang, "Color-coded projection grating method for shape measurement with a single exposure," Applied Optics, Jul. 10, 2000, pp. 3504-3508, vol. 39, No. 20, Optical Society of America, United States.

* cited by examiner

*Primary Examiner*—Thomas H. Tarcza
*Assistant Examiner*—Luke D. Ratcliffe
(74) *Attorney, Agent, or Firm*—Sughrue Mion, PLLC (57) ABSTRACT

Method for determining an axle geometry by recording and evaluating a topographical image of a face (6) of a wheel (1) fitted to an axle (2), and a sensor (10) for execution of the method. The method includes projecting light with a coding onto an area on the face (6) of the wheel (1) from a projecting direction; recording the light reflected from the area on the face (6) of the wheel (1) with an image converter (8), from a direction other than the light projecting direction; determining three-dimensional surface coordinates for the topographical image of the face (6) of the wheel (1) from the recorded light; and evaluating the topographical image in relation to a reference system.

32 Claims, 6 Drawing Sheets

FIG 1
Side view

FIG 2
Top view

FIG 3A

Measurement arrangement of entire system
$M_i$ = Measuring system i
$R_i$ = Tire system i
Ref = Reference system
Measurement: relation $R_i \rightarrow M_i$ ($_{R_i}T^{M_i}$)
Calibration: relation $M_i \rightarrow$ Ref ($_{M_i}T^{Ref}$)
$\rightarrow$ Relations $R_i \rightarrow$ Ref ($_{R_i}T^{M_i}\ _{M_i}T^{Ref}$)

FIG 3B

RELATED ART

FIG. 4A — Measured plane Twisting to X-axis of projector conforms to the "track" as an approximation FIG. 4B — Measured plane twisting to Y-axis of projector conforms to the "camber" as an approximation

METHOD FOR DETERMINING AN AXLE GEOMETRY AND SENSOR FOR ITS EXECUTION

The present application is based on German Patent Application No. 10335829.3, filed on Aug. 5, 2003, which is incorporated into this application by reference in its entirety.

FIELD OF AND BACKGROUND OF THE INVENTION

The present invention relates to a method and a sensor for determining an axle geometry, such as the track and camber on an axle of a motor vehicle. In general, an axle geometry is determined for each wheel fitted to an axle by means of determining a normal vector on the face of the wheel in relation to a common reference system.

An axle geometry on fitted wheels is usually measured during the final assembly of the motor vehicle or when working on the running gear of the vehicle in a workshop. In order to adjust the relative alignment of the wheels in relation to a reference system (e.g., the axle or the entire vehicle) by adhering to specific set point values, the actual, measured values must first be determined. With these actual values, the wheels are then precisely aligned via adjustment elements, in which case a new adjustment for checking can be calibrated once again.

Conventional methods measure axle geometry by using laser probes. For the illumination and signal recording, so-called light section methods are used. For each wheel to be measured, a plurality of laser probes is used, wherein each laser probe projects a line of light, in a radial direction, onto the outer tire cover area. Accordingly, a height profile of this linear range of the tire cover is recorded or calculated, the profile being in a common reference coordinate system.

By combining the test results of several sensors, the position of the normal vectors of a wheel can be determined. This determination can be made for individual wheels or simultaneously for all the wheels. The practical use of this method is to determine the track and camber values and to evaluate these values with respect to their deviation from required values.

There are various conventional methods used to determine the position of a tire relative to a reference system. For example, German Patent Publication DE-A-29 48 573 discloses a method and a device for the non-contact measurement of vehicle axles. Specifically, DE-A-29 48 573 describes contact-free measurements for determining an axle geometry on motor vehicles that, in addition to an illumination, include TV receiver tubes as receiving units. The method disclosed in DE-A-29 48 573 involves looking at the elliptical image of the outer rim diameter of a wheel, whereby the characteristics of the ellipse are determined. By changing the relative position between the television camera and the wheel, several images are recorded for evaluation purposes.

Further, a non-contact recording sensor is generally known from U.S. Pat. No. 4,745,469 which, using a structured light, illuminates the surface of a rotating tire with at least two contour lines: The contour lines are recorded, converted optoelectrically, and then evaluated by means of a video camera using the light that is reflected back from the tire. Distances are then measured by triangulation.

However, conventional measurement methods for analyzing an axle geometry of a wheel on a motor vehicle have a disadvantage in that they project only lines, circles, or ellipses, as geometrically structured light patterns, on a wheel to be measured. As such, the surface of the wheel cannot be recorded completely, even if a plurality of images are successively evaluated on the rotating wheel.

In particular, the influence of unevenness on a tire cover surface of a motor vehicle tire plays an important role in that it interferes with the evaluation of the image, or it does not allow a stable recording of the measured values. Unevenness on the surface of a tire includes, for example, the name of the make of the tire, dimensional specifications, rotating direction arrows, or other specifications. In order to determine a reference plane that is used to represent e.g., the outer face of a tire, interferences caused by unevenness that is not distributed evenly must be calculated out or averaged out around the tire. This is not possible with conventional methods in which either the tire is aligned by determining the position of the tire rim, or the tire cover is scanned or illuminated with only a few contour lines.

OBJECTS OF THE INVENTION

An object of the present invention is to provide a method and a sensor for measuring an axle geometry of a wheel on a motor vehicle. Another related object is to increase the overall recording reliability in the data processing to achieve a robust embodiment of the corresponding sensor.

SUMMARY OF THE INVENTION

Consistent with one formulation of the present invention, a method is provided for determining an axle geometry by recording and evaluating a topographical image of a face of a wheel fitted to an axle. The method includes:

projecting light spread over an area with a coding spread over the area onto the face of the wheel from a projecting direction;

recording the light reflected from the face of the wheel with an image converter as a topographical image, from a direction other than the light projecting direction;

determining three-dimensional surface coordinates for the topographical image of the face of the wheel from the recorded light; and evaluating the topographical image in relation to a reference system.

The present invention is based, in part, on the recognition that, for measuring an axle geometry of a wheel on a motor vehicle a particularly robust and stable image recording and image processing can be achieved by calculating a normal vector or a reference plane of the wheel. Because of the unevenness that is distributed non-uniformly across the width of the tire on ordinary tires, it has been very costly thus far to guarantee the accuracy of the determined measured values of an axle geometry.

Consistent with the present invention, it is proposed that the measurement of the axle geometry, or the determination of a normal vector of a wheel, is accomplished preferably via a full-surface projection of light, along with a coding of the light that is also spread over the surface, onto the face of the wheel. The light reflected from the face of the wheel is then recorded as a full-surface image by an image converter, from a direction other than that in which the light was projected. This method yields the direct and enormous advantage that, instead of only a few measurement points being available (as are available using conventional methods), several million measurement points are available for evaluation purposes. Therefore, the visible face of the axle-mounted wheel can be characterized by a picture upon which the evaluation of many pixels can be performed. As a result, a robust and stable image recording and processing system is provided in that every unevenness on the face of the wheel (particularly on the generally flat, ring-shaped, outer wheel cover) is recorded, and a reference plane can reliably be determined. Further, each bead occurring in the pneumatic tire in the vicinity of the contact area of the tire with the ground can be evaluated as unevenness or as interference.

In the case of a method according to the present invention for measuring an axle geometry or for determining a normal vector, a so-called height scanning-pattern image or distance image is recorded, wherein the coding of the light serving to illuminate an object is used to organize the light rays reflected from the object and received by an image converter. Practically at the same time, a distance value between the image converter and the object or object point is determined for each pixel so that there is an entire distance image. Thus, an illumination unit illuminates the object over an area and with a coding. Further, a video camera, i.e. a recording unit for generating color or grayscale images over an area, can be used as the image converter.

In a particularly advantageous formulation of the present invention, for example, either striated patterns with varying periodicity, monochrome lattice structures, or color coding can be used as the coding. It is important that the coding is provided over an area so that the recording reliability for data or image processing is guaranteed at each point of the object to be recorded. Another form of the coding can be given, for example, by a two-dimensional color pattern consisting of colored pattern elements that provide a particularly compact and, therefore, interference-safe color pattern for the coding. This results in an advantage that the projection angle of a pattern element in the recorded image of the two-dimensional color pattern projected on an object can be determined reliably. A further advantage is the fact that such a color pattern need be projected on the object only once.

An advantageous coding method is generally known, for example, from the German Patent Application Number 102 32 690.8. As disclosed in this reference, for example, an object to be recorded with a color pattern is illuminated, wherein the projection data is coded in color patterns by using a redundant code.

Consistent with the present invention, using a video method or a video camera results in advantages in as much as this constitutes a current, generally available and proven method for image recording, which keeps the system costs within limits.

Further, triangulation can used in an advantageous way for calculating the distance of each and every pixel.

A recorded distance image, also called a topographical image, is initially fully illuminated by the sensor, consistent with the present invention. This results in a full recording of the face of the wheel. Because the image evaluation in the image converter is based on the corresponding full-area image recorded, the image evaluation can be restricted to important object ranges relevant to image processing in an advantageous way by using an intermediate mask. For example, in this manner the centralized range that usually reproduces the rim of a wheel can be ignored. It is also conceivable for a number of sub-surface reference surfaces to be placed along the circular face area of the cover, and to be recorded and evaluated accordingly. For example, in this manner the bead of a pneumatic tire resulting from the vehicle's weight can be ignored when processing the image.

A reference plane, or a normal vector that is directly related to the reference plane, can also be determined, according to the invention, on a rotating wheel that completes at least one full revolution.

The parameters that are of greatest importance when adjusting a wheel of a motor vehicle are the camber and/or the track of the wheel. In general, camber means the tilting of a wheel around a longitudinal axis in the motor vehicle. The track of a wheel is the adjustment thereof that is in the direction in which the wheel is turned when steering.

In addition, a wide variety of further features of a wheel or neighboring motor vehicle parts can be determined, as long as these features can be accessed by the sensor system.

Consistent with the present invention, distance values taken from the topographical image can also be supplemented by detecting color variants. This enables the recording of specific colors on the tire, on the rim, or on similar elements visible on the face of the wheel.

Consistent with another formulation, the present invention is directed also to a sensor for determining an axle geometry by recording and evaluating a topographical image of a face of a wheel fitted to an axle. The sensor includes:

a light projection unit which projects light spread over an area with a coding spread over the area onto the face of the wheel from a projecting direction;

an image converter which records the light reflected from the face of the wheel as a topographical image, from a direction other than the projecting direction; and an evaluation unit which determines three-dimensional surface coordinates for the topographical image of the face of the wheel and which determines an axle geometry.

A sensor consistent with the present invention uses a light projection unit which projects light spread over an area and uses a coding that is also spread over an area onto the face of the wheel from a projecting direction. For example, this projection can be brought about by so-called beamers that are usually equipped with a chip having a micro-mirror arrangement. Accordingly, the codings can be fed from a computer system to the beamer, thereby opening up the option of retaining a coding unchanged, or changing the coding dynamically. The sensor includes the primary features of light projection over an area onto the object, and recording of light over an area using an image converter (e.g., a video camera). The image converter can in an advantageous way be a charge-coupled device ("CCD") or a complementary metal-oxide semiconductor("CMOS") color camera.

BRIEF DESCRIPTION OF THE DRAWINGS

The present invention will now be described in greater detail, by way of example, with reference to illustrative and non-limiting embodiments schematically depicted in the accompanying drawings in which.

DETAILED DESCRIPTION OF THE PREFERRED EMBODIMENTS

The present invention will now be described in detail by describing illustrative and non-limiting embodiments thereof with reference to the accompanying drawings. In the drawings, the same reference characters denote the same elements.

Figure 7:
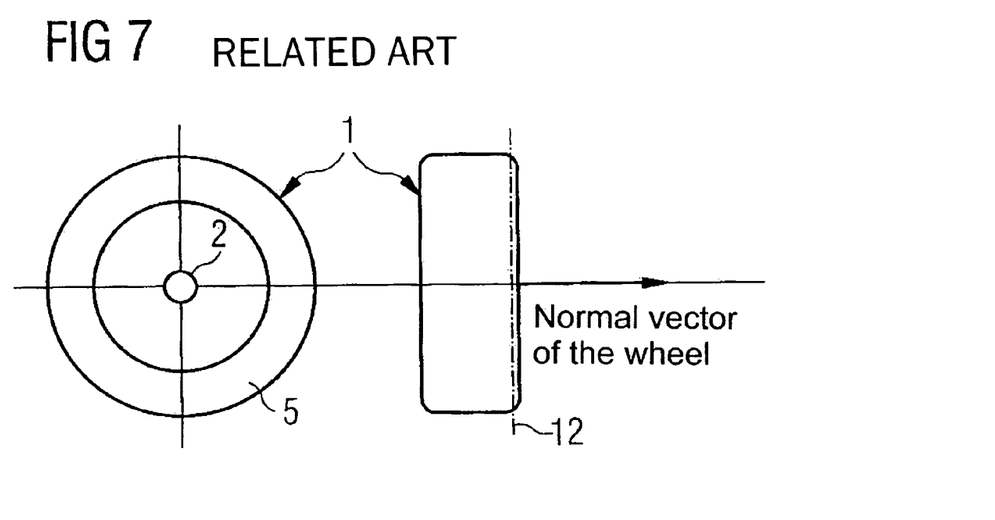
FIG. 7 shows a conventional representation of a wheel of a motor vehicle.
Figure 8:
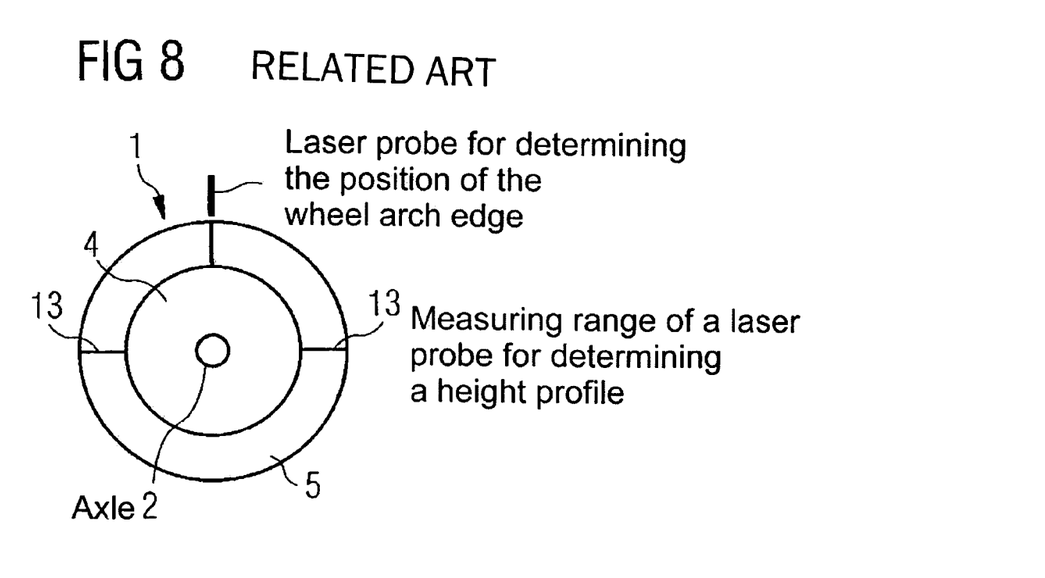
FIG. 8 shows a conventional method of measuring an axle geometry.

FIG. 7 is a diagrammatic representation of a wheel of a motor vehicle. The left portion of FIG. 7 shows the area of a wheel 1 that can be observed when facing the wheel. As shown in FIG. 8, moreover, a rim 4 is usually fitted to an axle 2. Further, a ring-shaped tire cover 5 is fitted to the rim 4. In particular, the laterally visible face of tire cover 5 is generally used for measuring an axle geometry.

As shown in FIG. 8, laser probes are used in conventional methods of measuring axle geometry that apply contour lines 13, which are radially aligned on an area of the tire cover 5 of the wheel 1. For example, a laser probe that illuminates the top part of the wheel 1 can apply an illumination that can be used for determining the position of the wheel arch edge. As shown in FIG. 7, a reference plane 12 of a face of a wheel is in direct relation to a normal vector of the wheel, which is perpendicular to the reference plane 12. Further, it is of no importance whether, or not, the normal vector points in the direction of the axle.

Consistent with the present invention, in order to eliminate the influence of any unevenness existing on the tire cover surfaces, such as tire designations, dimensional specifications or applications for the tire, each sensor determines a height profile on the tire by averaging a number of measurements that are recorded while rotating the wheel. These measurements are carried out over a full-surface of the tire so that each recording consists of many measuring points, for example, three million pixels. The result of this measurement provides a reference position of the wheel in a reference system, which is usually based on the motor vehicle overall. Measurements can be taken thereafter without rotating the wheel. In this manner, only the deviation of the reference position from the measurements determined beforehand must be taken into consideration. The existing influence of tire cover unevenness is eliminated by relative observation or by averaging. In addition, determining the height position of the wheel arch edge can give information about how far the weight ratios in the motor vehicle must be taken into consideration when measuring an axle geometry.

According to the present invention, an axle geometry is measured at the wheels of a motor vehicle by using an optical image transmitting sensor. From the image information generated, the pixel-associated distance values of an observed object are calculated by an image converter, and these values are arranged relative to a reference system. The results represent a so-called depth data image, distance image, or topographical image. The sensor includes a projection device with which coded light, such as color stripes or monochrome lattice structures, is projected onto the area to be measured. The sensor also includes a camera, which records the area illuminated in this manner on a color or grayscale image. From the recorded image, the distance to the observed object can be calculated for each pixel by using triangulation, utilizing the coding pattern that can be seen in the image. The coding pattern can be monochrome or colored. In general, this calculation can be performed using a conventional home computer, whereby typical processing rates of approximately 15 depth data images per second can be obtained.

Figure 1:
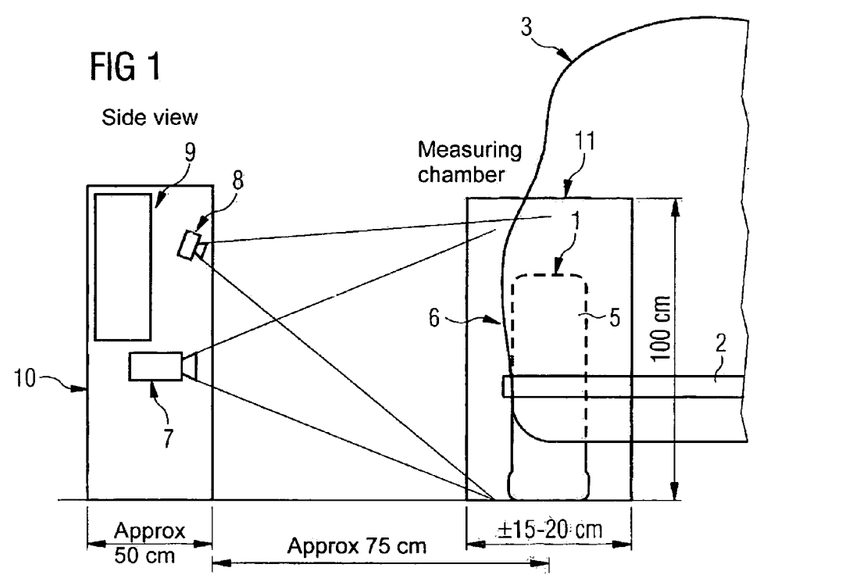
FIG. 1 shows a side view of a measurement arrangement of a sensor and a wheel to be measured.

With an image converter 8 (e.g., a charge-coupled device ("CCD") or complementary metal-oxide semiconductor ("CMOS") camera), the sensor captures the visible area of a wheel being measured. A light projection unit 7 can thereby illuminate the entire wheel. Accordingly, following the measurement, a height profile for the entire tire cover area can be recorded. In addition, a height profile for the entire front face of the wheel can be recorded.

Of importance is the use of a wide-area distance sensor, whereby the entire width of the tire cover can be recorded, yielding an extremely high volume of measurement data with one individual measurement, whereby the robustness and the accuracy of the measurement increases significantly. Some advantages of a wide-area distance sensor are that the handling of the object surface over an area takes into consideration the totality of the unevenness on a tire cover and, thus, the irregularities encountered using conventional methods or sensors do not emerge. This is a result of the vast quantities of data that are distributed over the tire cover.

The correspondingly large work area of a wide-area distance sensor has a further advantage in that an axle geometry of different wheel dimensions can be measured with a uniform sensor arrangement. As a result, the structure of the measuring system is simplified because the sensor does not need a mechanical displacing device. In particular, the wheel arch edge can also be determined simultaneously with an axle geometry measurement, without additional sensors.

In addition to the actual measurement of a normal vector of the wheel, further measurement tasks can be carried out by using the calculated height grid values determined on the basis of the grayscale or color data. For instance, measurement tasks such as checking the rim type that has been fitted can be carried out. Such a task is determined on the basis of the given geometry of the rim.

A conventional commercial projection device for coded light is provided in this embodiment of the sensor, in combination with a standard video method for recording an image. Accordingly, only one individual sensor system is required when measuring a normal vector of a wheel. Therefore, the system costs are kept low. Indeed, one sensor system per wheel is sufficient. Further, simplified calibration is achieved in that only the relation of one sensor system to one reference system must be determined.

Consistent with an illustrative and non-limiting embodiment of the present invention, FIG. 1 shows a sensor 10 and a measuring chamber 11, wherein the sensor 10 is, for example, at a specified distance of less than 1 meter from a wheel 1 of the vehicle 3. The sensor determines the surface contour of the wheel 1 on its face 6. In particular, primary data to be calculated relates to the tire cover 5, which exhibits irregular unevenness.

By way of example, the sensor 10 includes a camera as the image converter 8, a light projection unit 7, and an evaluation unit 9. Approximate dimensional specifications are provided from FIG. 1. Important is the capability of the full-surface illumination of an object and the capability of a full-surface image recording with subsequent evaluation for determining a topographical image.

Figure 2:
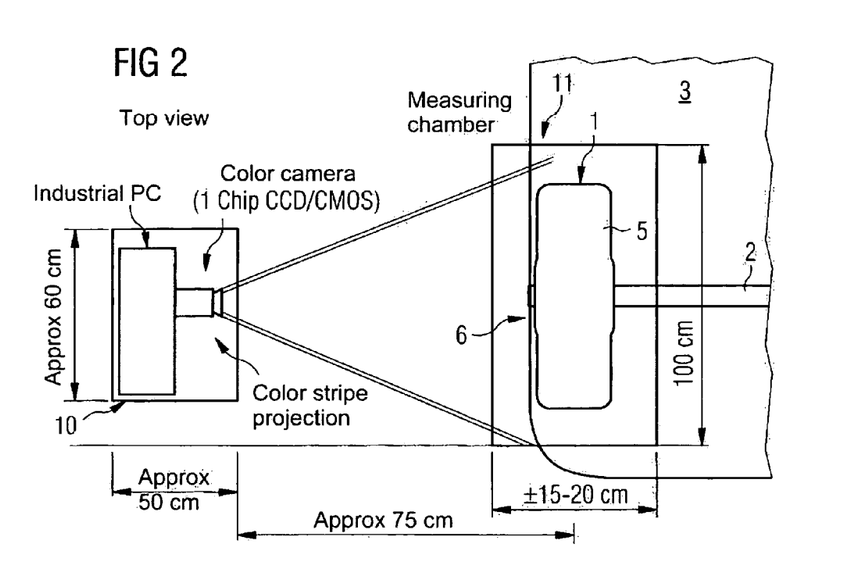
FIG. 2 shows a top view of an arrangement corresponding to the arrangement shown in FIG. 1.

FIG. 2 shows a top view of an arrangement that corresponds to that shown in FIG. 1. The image converter 8 and the light projection unit 7 are positioned one on top of the other in FIG. 2. However, the different illumination direction and image recording direction can, in essence, be seen in FIG. 1. FIG. 2 gives similar dimensions of the entire structure.

Figure 3A:
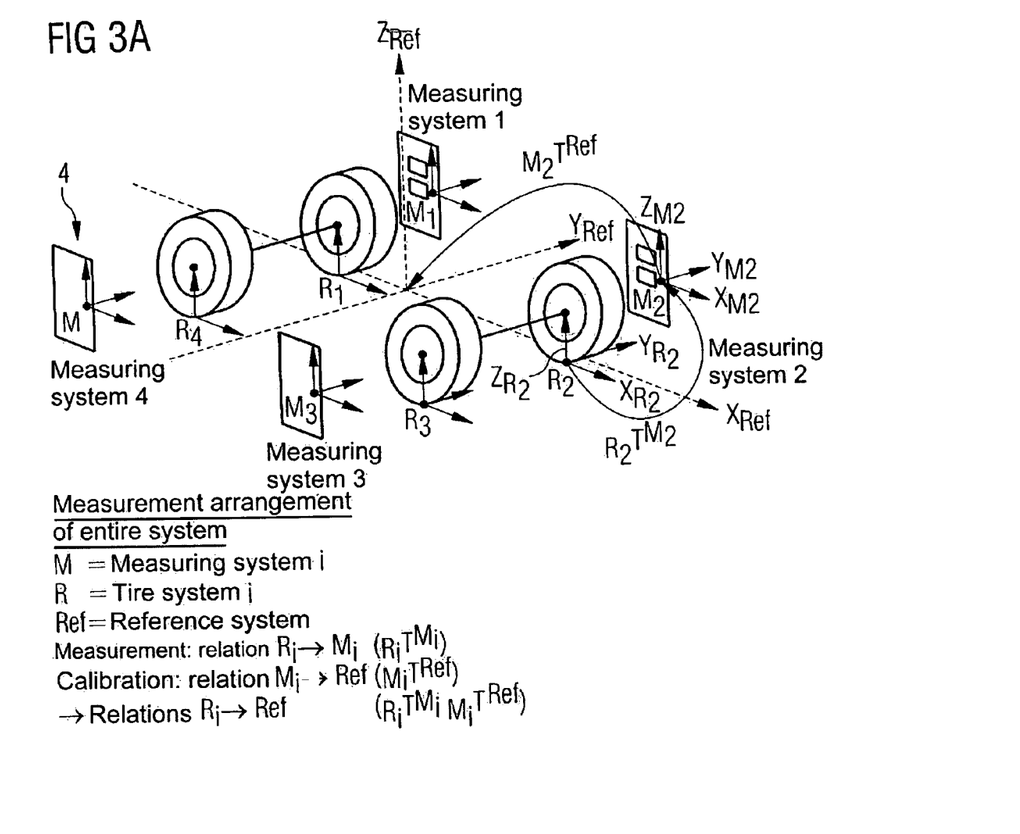
FIG. 3A shows an embodiment consistent with the present invention including the coordinate systems of the tires, the sensors, and the reference system.
Figure 3B:
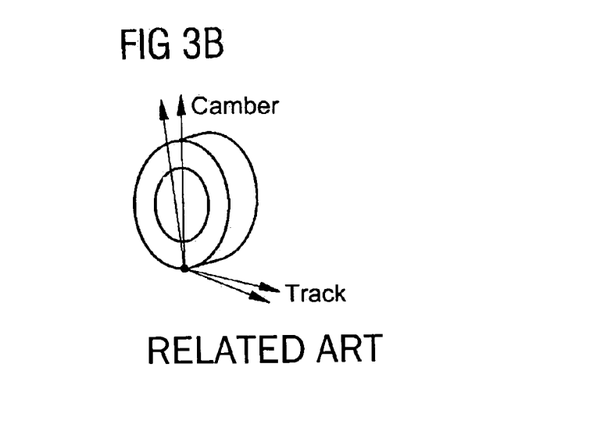
FIG. 3B shows a position of the camber and the track on an individual wheel.

By way of example, FIG. 3B shows what features must be adjusted or corrected (e.g., the camber or the track) when measuring the entire axle geometry of an individual tire on a wheel. The track, i.e., the track adjustment, is carried out such that, for a neutral steering wheel position, the wheel yields at least approximately a straight course. Corresponding set values must therefore be adhered to. The camber, i.e., the camber adjustment, is a turning or tilting of the wheel with respect to an axle in the longitudinal direction of the reference system. Therefore, in the case of an incorrectly adjusted camber, a wheel can indeed follow a straight course, but is not positioned perpendicularly.

FIG. 3A shows the three coordinate systems or reference systems occurring in the above-described systems. First, the reference system with the designation "R" refers to the tire system that must be taken into consideration if, for example, the sensor must be adjusted to achieve the illumination of the entire tire. Second, a coordinate system that refers to the measuring system or sensor system is designated with an "M." Third, the reference system with the designation "Ref," which is supervisory in the entire system, refers to the entire motor vehicle. Accordingly, all the data recorded by the sensors is converted to the reference system Ref, and the position of a reference plane 12 (shown in FIG. 4A and FIG. 4B), or a normal vector of a wheel, can be given within the reference system Ref. In this manner, a sequence is specified in the sense that there is a relation between the tire system R vis a vis the measuring system M, wherein the measuring system M is calibrated for reference system Ref. Further, the coordinate systems each have their own three spatial coordinates.

Figure 4A:
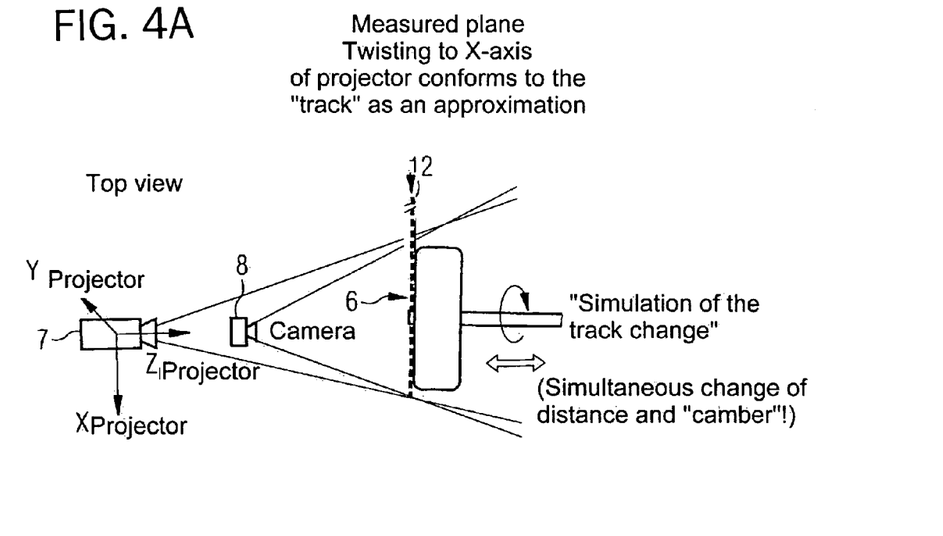
FIG. 4A shows a top view of a sequence of a measurement method consistent with the present invention.
Figure 4B:
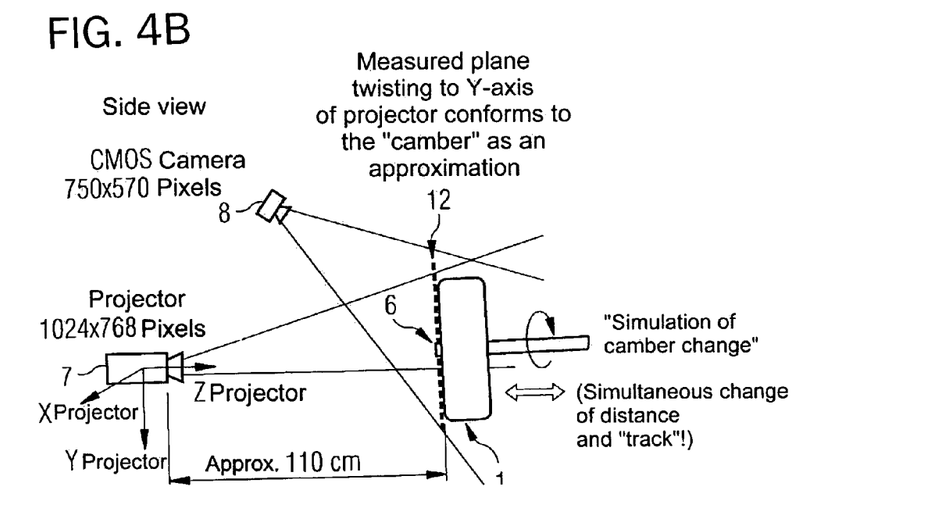
FIG. 4B shows a side view of a sequence of a measurement method consistent with the present invention.

FIG. 4A shows a top view of a reference system of a projector, measurement, or sensor system consistent with the present invention. The projector 7 and the camera 8 are arranged such that they are vertically displaced (which cannot be seen in FIG. 4A, but is shown in FIG. 4B). As shown in FIG. 4A, a reference plane 12, which is determined by recording an image and evaluating the face 6 of the wheel 1, has a position that is at a specific angle to the X-axis of the projector 7. In this reference system, the track of the wheel can be measured so that a specific set value can be adjusted.

FIG. 4B is a side view of a sensor system consistent with the present invention. The reference system shown in FIG. 4B corresponds to that shown in FIG. 4A. As shown in FIG. 4B, the alignment of the reference plane 12 provides a measurement of the camber of the wheel 1 and a corresponding adjustment based on the measurement to a set value. A so-called beamer, for example, can be used as the light projection unit 7. Moreover, the camera 8 can be, for example, a CMOS camera with 750×570 pixels.

Figure 5:
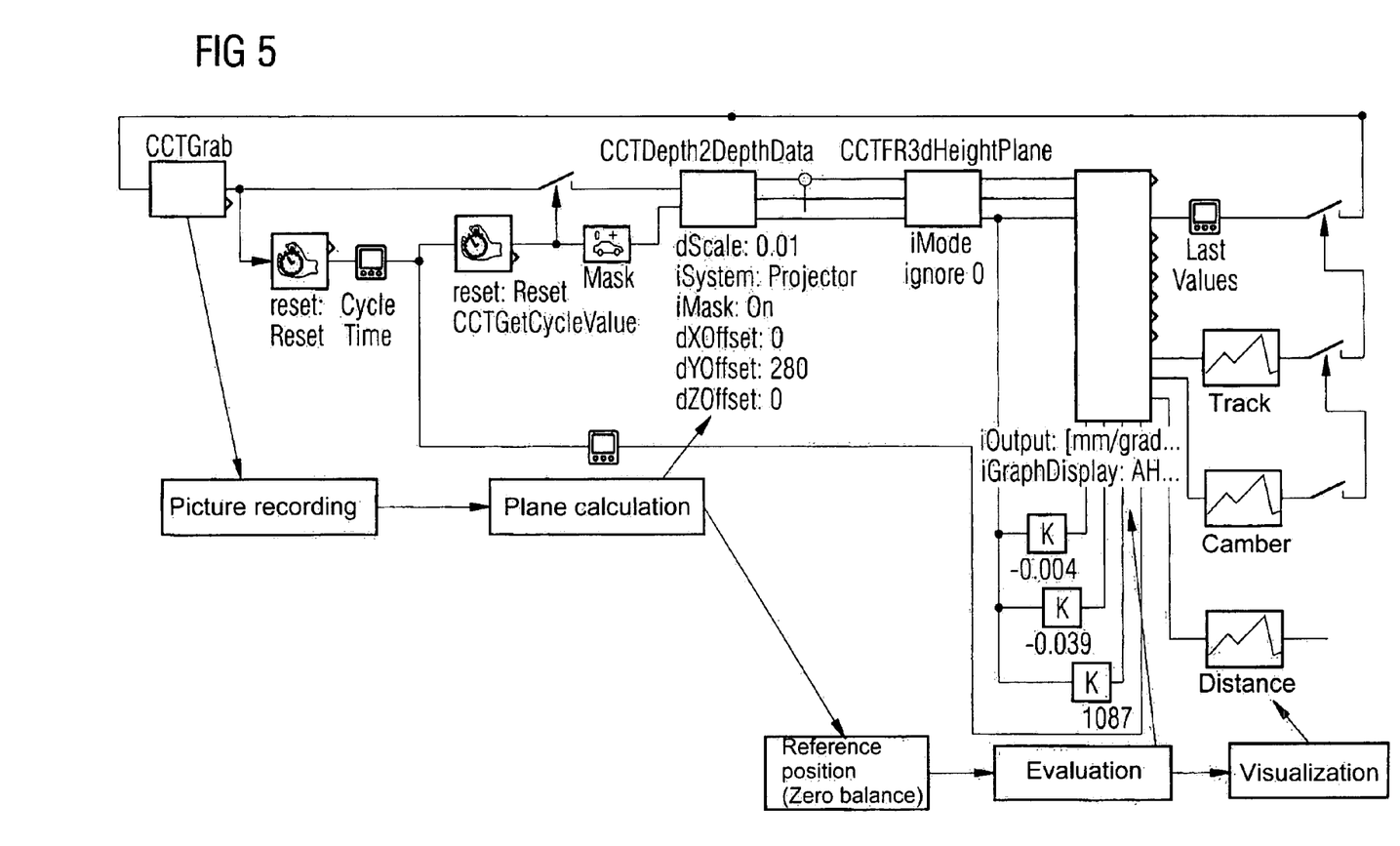
FIG. 5 shows an approximate measurement sequence consistent with the present invention.

FIG. 5 provides an illustrative and non-limiting sectional sequence algorithm for a method consistent with the present invention. To start the method, the object is illuminated and the image recorded. The image evaluation calculates a specific plane that is a typical feature for adjustment of the wheel in the room or relative to a reference system. In this respect, a reference position is calculated after the plane has been calculated or a zero adjustment is carried out. The subsequent evaluation concerns determining the values of the axle geometry, such as the track and camber. A subsequent display makes it possible to record the current values and, therefore, also deviations from a set value.

Figure 6:
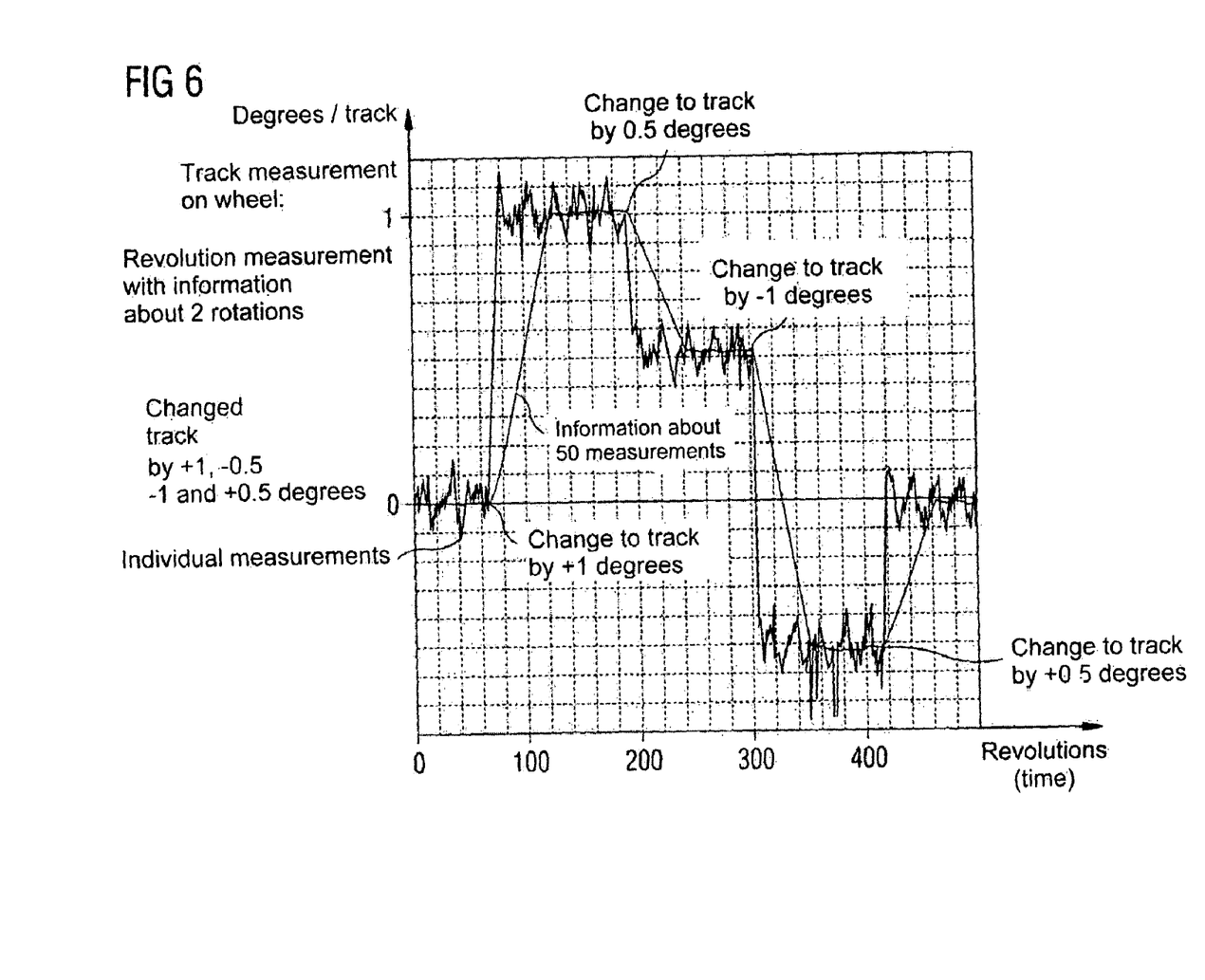
FIG. 6 shows a determined measurement curve consistent with the present invention.

FIG. 6 shows a graph of a test run for a track measurement. The coordinate system is spanned by an abscissa, on which the time or the revolutions of a wheel are plotted and by an ordinate, on which the measured track values are provided. The entire measurement shown corresponds to two revolutions of a wheel. During this time interval, 50 measurements are carried out and, consequently, 50 image recordings are produced and evaluated. In this manner, the track of the wheel is changed step-by-step and, in particular, by +1°, −0.5°, −1°, and +0.5°. It can be seen that individual measurements give a sequence of peaks in the curve. The five different levels of the measurement curves show a sequence of peaks on each level. An averaging of these peak values, for example, over 50 measurements, gives a static curve in sections that reliably shows the current track adjustment.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for determining an axle geometry by recording and evaluating a single graylevel image or a single color image of a face of a wheel fitted to an axle, the method comprising:

projecting light, which is spread over the face to be evaluated, wherein a coding is projected with the light, from a projecting direction;

recording light reflected from the face of the wheel with an opto-electronic image converter as a single graylevel image or a single color image, from a direction other than the light projecting direction;

determining three-dimensional surface coordinates of at least substantially the entire face to be evaluated from said single graylevel image or said single color image using triangulation; and evaluating said single graylevel image or said single color image in relation to a reference system.

2. A method according to claim 1, wherein the coding comprises striated patterns with varying periodicity or monochrome lattice structures.

3. A method according to claim 1, wherein the coding comprises a color coding.

4. A method according to claim 1, wherein a video camera is used as the image converter.

5. A method according to claim 1, wherein said single graylevel image or said single color image includes the entire face of the wheel.

6. A method according to claim 1, wherein said single graylevel image or said single color image is embodied in the form of a ring and includes a face of a tire cover.

7. A method according to claim 1, wherein said single gravievel image or said single color image includes at least one partial area of a face of a tire cover to be detected.

8. A method according to claim 1, wherein several images of a rotating wheel are recorded.

9. A method according to claim 8, wherein the wheel carries out at least one full rotation to determine a reference plane.

10. A method according to claim 1, wherein a normal vector of the wheel is used for determining the axle geometry.

11. A method according to claim 1, wherein at least one of the camber of the wheel and the track of the wheel is determined via a normal vector of the wheel.

12. A method according to claim 1, wherein in addition to determining the axle geometry, further properties of at least one of the wheel, a rim, and a tire cover are determined.

13. A method according to claim 1, wherein in addition to determining the axle geometry, further properties of vehicle body areas adjoining the wheel are determined.

14. A method according to claim 13, wherein the further properties of vehicle body areas comprise a position of the wheel arch edge.

15. A method according to claim 1, wherein in addition to said single graylevel image or said single color image of the face of the wheel, color variants of the face of the wheel are detected.

16. A method according to claim 1, wherein the reference system is a coordinate system of a vehicle.

17. A method according to claim 1, wherein the image converter is a charge-coupled device or a complementary metal-oxide semiconductor color camera.

18. A sensor for determining an axle geometry by recording and evaluating a single gravievel image or single color image of a face of a wheel fitted to an axle, the sensor comprising:
 a light projection unit which projects light, which is spread over the face to be evaluated, wherein a coding is projected with the light, from a projecting direction;
 an opto-electronic image converter which records light reflected from the face of the wheel as a single gravievel image or a single color image, from a direction other than the projecting direction; and
 an evaluation unit which determines three-dimensional surface coordinates of at least substantially the entire face to be evaluated from said single graylevel image or said single color image using triangulation, and which determines an axle geometry.

19. A sensor according to claim 18, wherein the light projection unit projects light with a coding comprising striated patterns with varying periodicity, or monochrome lattice structures.

20. A sensor according to claim 18, wherein the light projection unit projects light with a coding comprising color coding.

21. A sensor according to claim 18, wherein the image converter comprises a video camera.

22. A sensor according to claim 18, wherein the evaluation unit determines at least one of the camber of the wheel and the track of the wheel via a normal vector of the wheel.

23. A sensor according to claim 18, wherein the evaluation unit, in addition to determining the axle geometry, determines further properties of at least one of the wheel, a rim, and a tire cover.

24. A sensor according to claim 18, wherein the evaluation unit, in addition to determining the axle geometry, determines further properties of vehicle body areas adjoining the wheel.

25. A sensor according to claim 24, wherein the further properties of vehicle body areas comprise a position of the wheel arch edge.

26. A sensor according to claim 18, wherein the evaluation unit also detects color variants of the face of the wheel.

27. A sensor according to claim 18, wherein the evaluation unit evaluates the three-dimensional surface coordinates for said single graylevel image or said single color of the face of the wheel in relation to a reference system.

28. A sensor according to claim 27, wherein the reference system is a coordinate system of a vehicle.

29. A sensor according to claim 18, wherein the sensor determines an axle geometry by recording and evaluating a single graylevel image or single color image of a face of a rotating wheel fitted to an axle.

30. A sensor according to claim 18, wherein the image converter is a charge-coupled device or a complementary metal-oxide semiconductor color camera.

31. A method according to claim 1, wherein the projected light is spread over at least a million measurement points at a given instant in time during a measurement.

32. A sensor according to claim 18, wherein the light projection unit projects light over at least a million measurement points at a given instant in time during a measurement.

* * * * *